(12) United States Patent
Wright

(10) Patent No.: US 10,583,762 B2
(45) Date of Patent: Mar. 10, 2020

(54) CONTROL SYSTEM FOR A PNEUMATIC SUPPORT MECHANISM

(71) Applicant: KA GROUP AG, Zurich (CH)

(72) Inventor: John Paul Wright, Tamworth (GB)

(73) Assignee: KA GROUP AG, Zurich (CH)

( * ) Notice: Subject to any disclaimer, the term of this patent is extended or adjusted under 35 U.S.C. 154(b) by 280 days.

(21) Appl. No.: 15/636,043

(22) Filed: Jun. 28, 2017

(65) Prior Publication Data

US 2019/0001848 A1  Jan. 3, 2019

(51) Int. Cl.
*B60N 2/02* (2006.01)
*B60N 2/90* (2018.01)
*B60N 2/66* (2006.01)

(52) U.S. Cl.
CPC .......... *B60N 2/914* (2018.02); *B60N 2/0224* (2013.01); *B60N 2/665* (2015.04)

(58) Field of Classification Search
CPC ...... B60N 2/914; B60N 2/665; B60N 2/0224; B60N 2002/0268; B60N 2002/0272; B60N 2205/00; B60C 25/002; B60C 23/10; B60C 23/14; B60C 23/16
USPC ... 141/1, 10, 67, 68, 83, 95, 96, 197, 311 R, 141/313–317; 222/3, 251, 333; 73/1.71, 73/714, 865.8, 865.9, 432.1, 146.3–146.5; 137/625, 625.11, 625.12, 625.13, 625.18, 137/625.2, 627, 628, 883
See application file for complete search history.

(56) References Cited

U.S. PATENT DOCUMENTS

| | | | | |
|---|---|---|---|---|
| 5,879,053 A | * | 3/1999 | Lux | B60N 2/01591 297/378.1 |
| 6,058,341 A | * | 5/2000 | Myers | B60N 2/002 177/144 |
| 6,098,000 A | * | 8/2000 | Long | A47C 4/54 701/49 |
| 6,427,538 B1 | | 8/2002 | Potter | |
| 2005/0137506 A1 | * | 6/2005 | Chow | A61H 9/0078 601/149 |
| 2017/0035139 A1 | * | 2/2017 | Weatherby | A63B 71/081 |

FOREIGN PATENT DOCUMENTS

RU  2620144  * 5/2017

* cited by examiner

*Primary Examiner* — Robert R Raevis
(74) *Attorney, Agent, or Firm* — Cantor Colburn LLP

(57) ABSTRACT

A control system for an inflatable support mechanism having a fluid inlet includes at least one inflate valve including an inlet, and a purge valve including an inlet portion and an outlet portion. The inlet portion is fluidically connected to the inlet. No more than one absolute pressure sensor is fluidically connected between the fluid inlet and the inlet of the at least one inflate valve and the inlet portion of the purge valve the no more than one absolute pressure sensor selectively sensing pressure within the inflatable support mechanism and atmospheric pressure.

8 Claims, 3 Drawing Sheets

CONTROL SYSTEM FOR A PNEUMATIC SUPPORT MECHANISM

INTRODUCTION

The subject disclosure relates to the art of support mechanisms and, more particularly, to a control system for a pneumatic support mechanism.

Support mechanism, such as seats, chairs, mattresses, and the like are employed by individuals in a variety of settings. Typical support mechanisms include a surface that may be as a seat, a bed, or other forms of personal rest. The surface may be hard or padded. Padded support mechanisms typically include a cushion that enhances comfort. To further enhance comfort, certain support mechanisms may include a selectively adjustable cushion.

Adjustable cushions may take the form of mechanical adjustments, in which a lever may shift a bolster into a different position, or pneumatic adjustments that rely on selectively inflatable bladders. Support mechanisms that incorporate inflatable bladders typically include a pump, one or more valves and sensors. Valves may include inflate valves and deflate valves. Sensors may include multiple absolute pressure sensors, or a gauge pressure sensor.

At least two absolute pressure sensors are currently employed on most inflatable support systems. One absolute pressure sensor is arranged to measure bladder pressure and another absolute pressure sensor is arranged to measure atmospheric pressure. Alternatively, a single gauge pressure sensor may be employed. A gauge pressure sensor includes a first portion arranged to sense bladder pressure and a second portion arranged to sense atmospheric pressure. Valves and sensors increase an overall cost of the support mechanism. Gauge pressure sensors are more costly than absolute pressure sensors. Other systems may employ a remote absolute pressure sensor. That is, an absolute pressure signal may be passed from another source. Such systems require the presence of the another device to sense and deliver a pressure signal. Cost is a major driver in manufacturing considerations and consumer purchases. The use of multiple sensors or other sensing devices raises manufacturing costs which are typically passed along to consumers. Accordingly, it is desirable to provide support mechanism that may rely upon fewer components so as to reduce manufacturing and inventory costs and end price to consumers.

SUMMARY

In accordance with an aspect of an exemplary embodiment, a control system for an inflatable support mechanism having a fluid inlet includes at least one inflate valve including an inlet, and a purge valve including an inlet portion and an outlet portion. The inlet portion is fluidically connected to the inlet. No more than one absolute pressure sensor is fluidically connected between the fluid inlet and the inlet of the at least one inflate valve and the inlet portion of the purge valve the no more than one absolute pressure sensor selectively sensing pressure within the inflatable support mechanism and atmospheric pressure.

In accordance with another aspect of an exemplary embodiment, an inflatable support mechanism having a fluid inlet includes at least one inflatable bladder, and a control system operable to selectively inflate the at least one inflatable bladder. The control system includes at least one inflate valve including an inlet and an outlet fluidically connected to the at least one inflatable bladder and a purge valve including an inlet portion and an outlet portion. The inlet portion is fluidically connected to the inlet. No more than one absolute pressure sensor fluidically connected between the fluid inlet and the inlet of the at least one inflate valve and the inlet portion of the purge valve the no more than one absolute pressure sensor selectively sensing pressure within the inflatable support mechanism and atmospheric pressure.

In accordance with yet another aspect of an exemplary embodiment, a method of operating an inflatable support mechanism includes opening an inflate valve fluidically connected to an inflatable bladder, delivering a fluid flow into an inlet conduit through the inflate valve into the inflatable bladder, sensing a pressure of the fluid in the inflatable bladder with an absolute pressure sensor, inflating the inflatable bladder to a selected pressure, closing the inflate valve, opening a purge valve exposing the inlet conduit to atmospheric pressure, and sensing atmospheric pressure through the inlet conduit with the absolute pressure sensor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
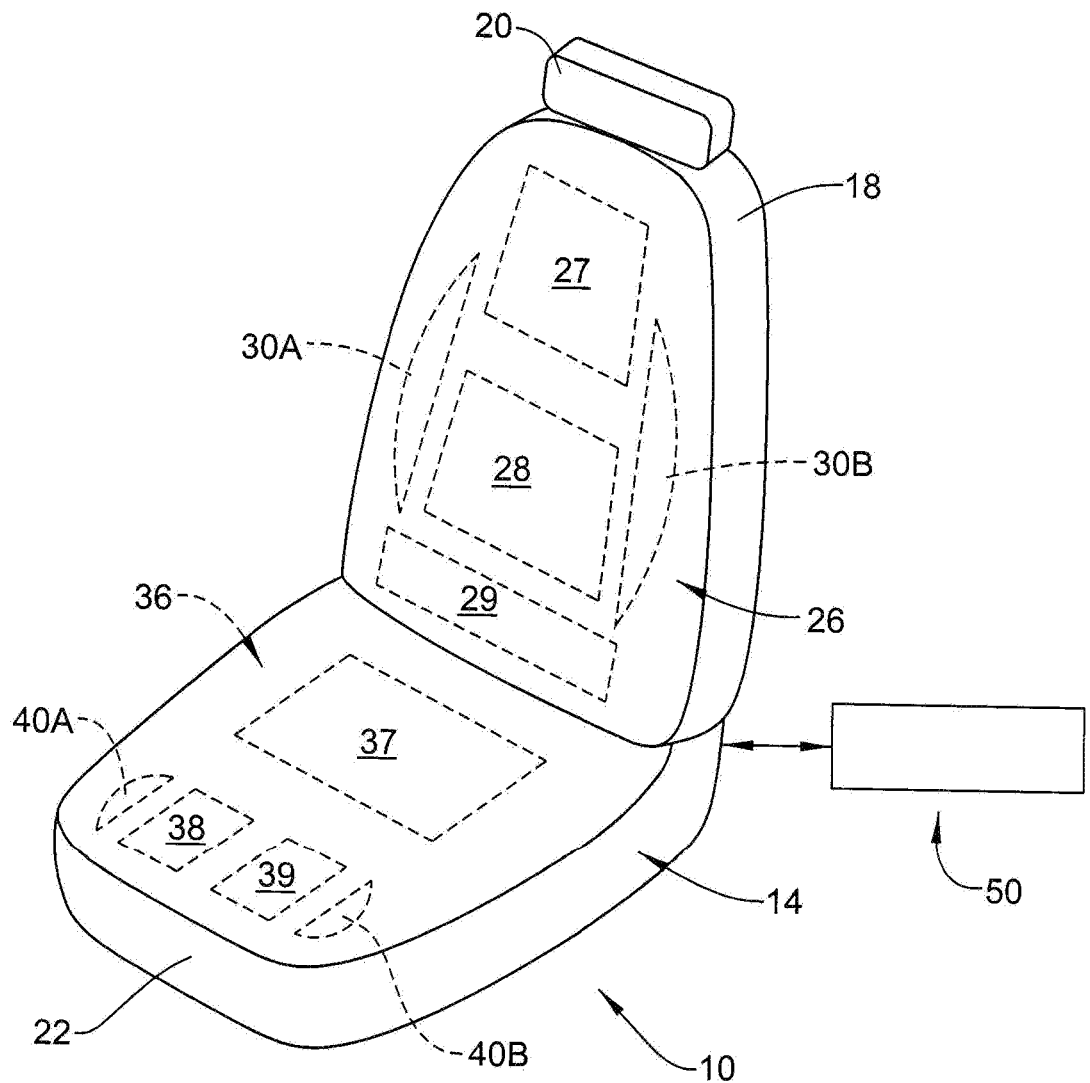
FIG. 1 depicts an inflatable support mechanism including a control system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

An inflatable support mechanism, in accordance with an exemplary embodiment, is indicated generally at 10 in FIG. 1. Inflatable support mechanism 10 is shown in the form of a motor vehicle seat 14. It is to be understood however that inflatable support mechanism 10 may take on a variety of forms including cushions, mattresses, or other devices that provide support. In the embodiment illustrated, inflatable support mechanism 10 includes a seat back 18 having a head rest 20 and a seat bottom 22. Seat back 18 includes a first plurality of inflatable bladders 26 that may be selectively inflated to provide a desired comfort level for a user. In the exemplary embodiment shown, the plurality of inflatable bladders 26 includes a first inflatable bladder 27, a second inflatable bladder 28, a third inflatable bladder 29, and fourth and fifth inflatable bladders 30A and 30B. Seat bottom 22 may include a second plurality of inflatable bladders 36 including a first inflatable bladder member 37, a second inflatable bladder member 38, a third inflatable bladder member 39, and fourth and fifth inflatable bladder members 40A and 40B.

In accordance with an aspect of an exemplary embodiment, a control system 50 is operatively connected to inflatable support mechanism 10. Control system 50, as will be described herein, may selectively inflate and/or deflate one or more of the first plurality of inflatable bladders 26 and/or one or more of the second plurality of inflatable bladders 36. Control system 50 will be described in FIGS. 2 and 3 in terms of operating the first plurality of inflatable bladders 26 with an understanding that operation of the second plurality of inflatable bladders 36 is also contemplated.

Figure 2:
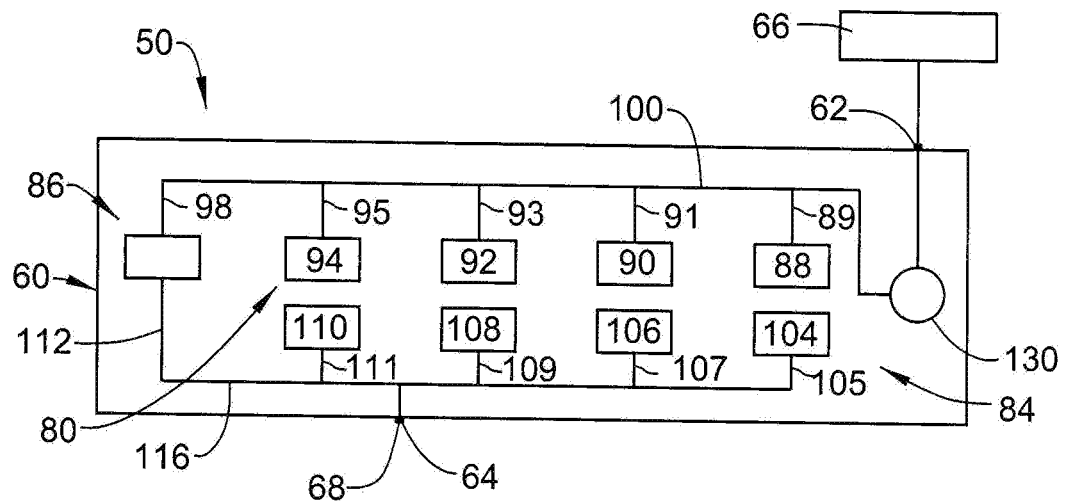
FIG. 2 is a schematic illustration of the control system, in accordance with an aspect of an exemplary embodiment.

As shown in FIG. 2, control system 50 may include a housing 60 having a fluid inlet 62 and a fluid outlet 64. Fluid inlet 62 may be fluidically connected to a pump 66 while fluid outlet 64 may be fluidically connected to atmosphere through an outlet conduit 68. Housing 60 may support a plurality of inflate valves 80, a plurality of deflate valves 84, and a purge valve 86. Inflate valves 80 may be selectively opened to fluidically connect pump 66 with select ones of the first plurality of bladders 26 and deflate valves 84 may be selectively opened to fluidically connect the first plurality of bladders 26 with atmosphere.

In accordance with an aspect of an exemplary embodiment, first plurality of inflate valves 80 may include a first inflatable valve 88 having a first inlet 89, a second inflatable valve 90 having an inlet 91, a third inflatable valve 92 having an inlet 93, and a fourth inflatable valve 94 having an inlet 95. Purge valve 86 is shown to include an inlet portion 98. Each inlet 89, 91, 93, and 95, and inlet portion 98 are fluidically connected to fluid inlet 62 through an inlet conduit 100. The plurality of deflate valves 84 includes a first deflate valve 104 having an outlet 105, a second deflate valve 106 having an outlet 107, a third deflate valve 108 having an outlet 109, and a fourth deflate valve 110 having an outlet 111. Purge valve 86 includes an outlet portion 112. Each outlet 105, 107, 109, and 111, and outlet portion 112 are fluidically connected to fluid outlet 64 through an outlet conduit 116.

In accordance with an aspect of an exemplary embodiment, control system 50 includes no more than one absolute pressure sensor 130. Absolute pressure sensor 130 is fluidically connected between the plurality of inflate valves 80 and fluid inlet 62. As will be discussed herein, control system 50 includes a single absolute pressure sensor, e.g., absolute pressure sensor 130 that may measure pressure within one or more of the first plurality of inflatable bladders 26 and atmospheric pressure. The term "absolute pressure sensor" should be understood to describe a sensor that senses a pressure relative to a vacuum. The term "absolute pressure sensor" should not be confused with a "gauge pressure sensor" or other forms of pressure sensors that do not detect an actual pressure relative to a vacuum.

Figure 3:
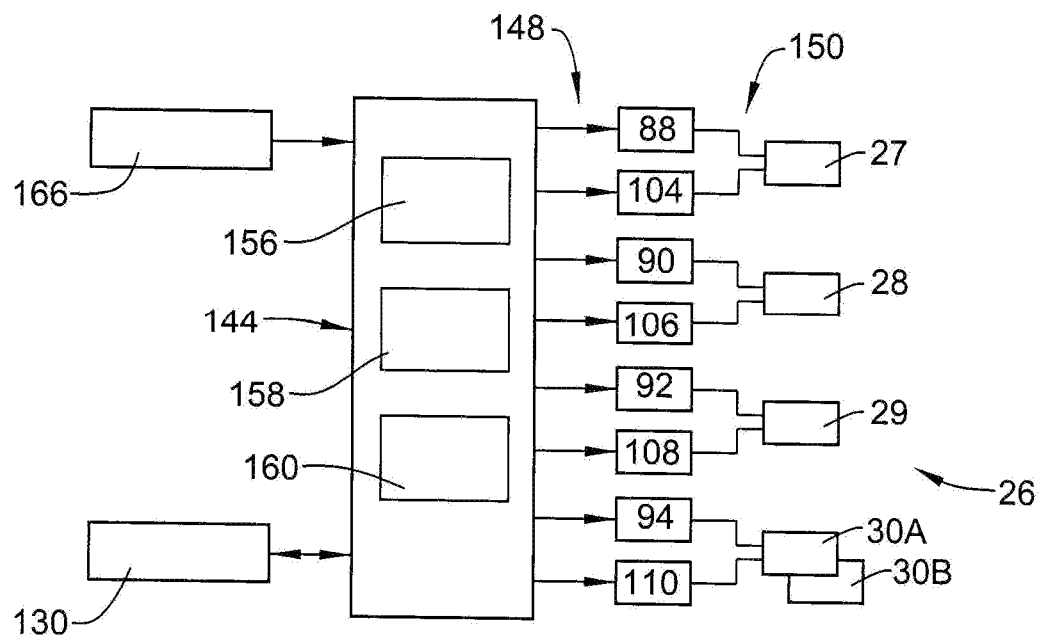
FIG. 3 is a block diagram illustrating the control system, in accordance with another aspect of an exemplary embodiment.

With reference to FIG. 3 and continued reference to FIG. 2, control system 50 may include a control module 144 that is electrically connected to each of the plurality of inflate valves 80 and each of the plurality of deflate valves 84 though signal conductors shown generally at 148. Each of the plurality of inflate valves 80 and each of the plurality of deflate valves 84 may be fluidically connected to corresponding ones of the first plurality of inflatable bladders 26 through a corresponding plurality of fluid lines indicated generally at 150. Control module 144 may include a central processor unit (CPU) 156, a non-volatile memory 158, and a regulation module 160. An input system 166 is coupled to control module 144 and allows a user to selectively adjust one or more of the first plurality of bladders 26 by operating one or more of the plurality of inflate valves 80 and/or one or more of the plurality of deflate valves 84. A user may also, through input system 166 select a desired comfort setting stored in non-volatile memory 158.

Figure 4:
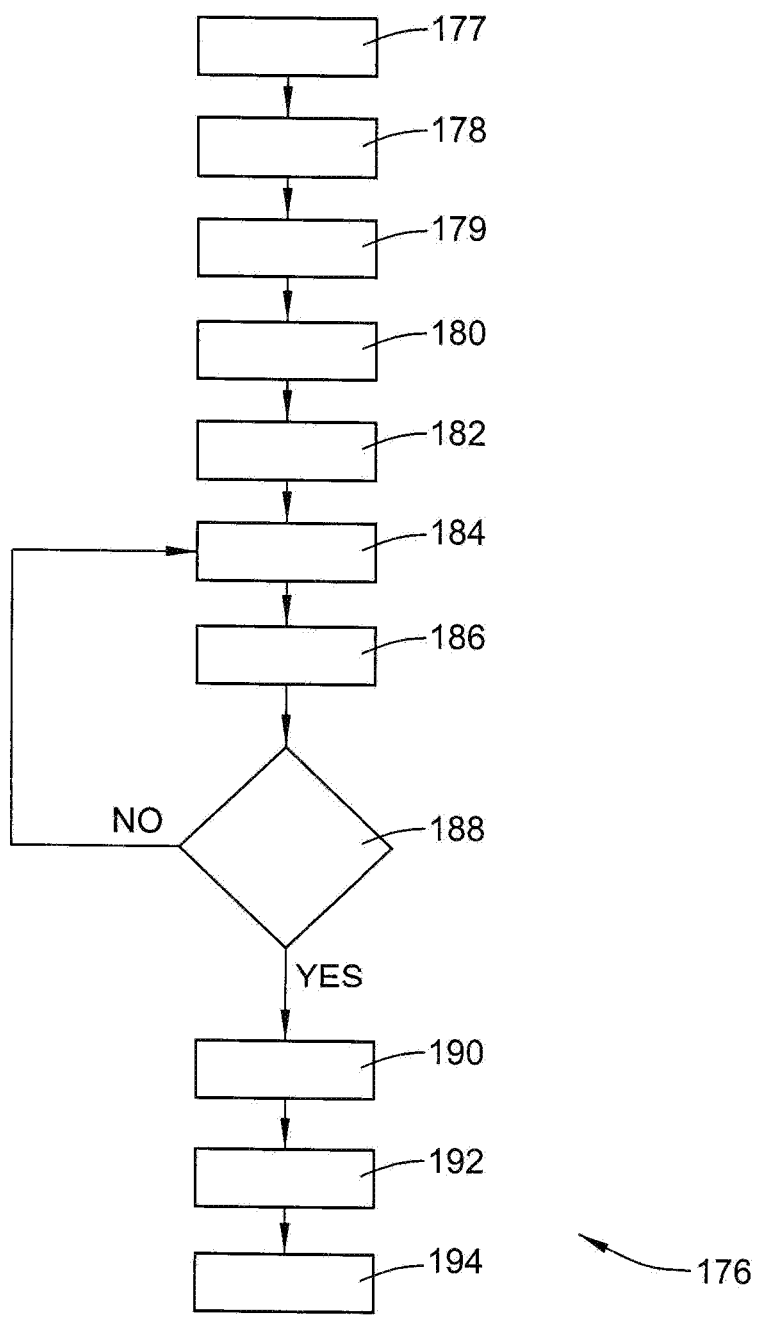
FIG. 4 depicts a flow diagram illustrating a method of operating an inflating an inflatable bladder of the inflatable support mechanism, in accordance with an aspect of an exemplary embodiment.

Reference will now follow to FIG. 4 in describing a method 176 of operating inflatable support mechanism 10 in accordance with an aspect of an exemplary embodiment. In accordance with an aspect of an exemplary embodiment, at block 177, purge valve 86 is opened and an ambient pressure value is sensed, and purge valve 86 is closed at block 178. The absolute pressure value is saved at block 179. A command to inflate one or more of the first plurality of inflatable bladders 26 may be received by control module 144 as shown at block 180. At block 182 pump 66 may be activated and at block 184 one or more of the plurality of inflate valves 80 may be opened allowing fluid to flow through fluid inlet 62 into inlet conduit 100. Absolute pressure sensor 130 measures pressure within the one or more of the first plurality of bladders 26 being inflated at block 186. At block 188, the ambient pressure value is utilized by control module 144 to determine whether additional pressure is needed. If additional pressure is needed, the one or more of the plurality of inflate valves 80 opened in block 184 remain open until a desired pressure is achieved.

Once the desired pressure is achieved, the one or more of the plurality of inflate valves 80 are closed and pump 66 is stopped at block 190. At block 192, purge valve 86 is open so any fluid remaining in inlet conduit 100 may pass into outlet conduit 116 and flow to atmosphere. With purge valve 86 open, absolute pressure sensor 130 is exposed to ambient and may again sense atmospheric pressure. By again sensing atmospheric pressure, control module 144 may more accurately inflate the one or more of the first plurality of bladders 26. When it is desired to deflate one or more of the first plurality of bladders 26, one or more of the plurality of deflate valves 84 may be opened allowing fluid to pass through outlet conduit 116 to ambient at block 194.

At this point it should be understood that exemplary embodiments describe a control system for selectively inflating one or more inflatable bladders of an inflatable support mechanism. The control system relies on a single, that is no more than one, absolute pressure sensor to detect and measure both atmospheric pressure and pressure within the one or more inflatable bladders. Thus, in contrast to existing system that rely on expensive gauge pressure sensors and or multiple absolute pressure sensors, the present invention employs a single absolute pressure sensor for operating the inflatable support mechanism. The use of a single absolute pressure sensor leads to a reduction in manufacturing complexity, simplification of design, and a reduction in costs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A control system for an inflatable support mechanism having a fluid inlet comprising:
   at least one inflate valve including an inlet;
   a purge valve including an inlet portion and an outlet portion, the inlet portion being fluidically connected to the inlet of the at least one inflate valve;
   at least one deflate valve including an outlet section fluidically connected to the outlet portion;
   a housing supporting the at least one inflate valve, the at least one deflate valve, and the purge valve, the housing also including a fluid inlet fluidically connected to the inlet of the at least one inflate valve and the inlet portion of the purge valve, and a fluid outlet fluidically connected to the outlet portion of the purge valve and the outlet section of the at least one deflate valve; and
   no more than one absolute pressure sensor fluidically connected between the fluid inlet and the inlet of the at least one inflate valve and the inlet portion of the purge valve, wherein the no more than one absolute pressure sensor selectively senses pressure within the inflatable support mechanism and atmospheric pressure.

2. The control system according to claim 1, wherein the no more than one absolute pressure sensor is mounted in the housing.

3. The control system according to claim 1, further comprising: a pump fluidically connected to the inlet of the at least one inflate valve and the inlet portion of the purge valve.

4. An inflatable support mechanism having a fluid inlet comprising:
   at least one inflatable bladder; and
   a control system operable to selectively inflate the at least one inflatable bladder, the control system comprising:
      at least one inflate valve including an inlet and an outlet fluidically connected to the at least one inflatable bladder;
      a purge valve including an inlet portion and an outlet portion, the inlet portion being fluidically connected to the inlet of the at least one inflate valve;
      at least one deflate valve including an inlet section fluidically connected to the at least one inflatable bladder and an outlet section fluidically connected to the outlet portion;
      a housing supporting the at least one inflate valve, the at least one deflate valve, and the purge valve, the housing also including a fluid inlet fluidically connected to the inlet of the at least one inflate valve and the inlet portion of the purge valve, and a fluid outlet fluidically connected to the outlet portion of the purge valve and the outlet section of the at least one deflate valve; and
      no more than one absolute pressure sensor fluidically connected between the fluid inlet and the inlet of the at least one inflate valve and the inlet portion of the purge valve, wherein the no more than one absolute pressure sensor selectively senses pressure within the inflatable support mechanism and atmospheric pressure.

5. The inflatable support mechanism according to claim 4, wherein the no more than one absolute pressure sensor is mounted in the housing.

6. The inflatable support mechanism according to claim 4, further comprising: a pump fluidically connected to the inlet of the at least one inflate valve and the inlet portion of the purge valve.

7. The inflatable support mechanism according to claim 4, wherein the at least one inflatable bladder comprises a plurality of independently inflatable bladders arranged in the inflatable support mechanism.

8. The inflatable support mechanism according to claim 7, wherein the at least one inflate valve comprises a plurality of inflate valves and the at least one deflate valve comprises a plurality of deflate valves, each of the plurality of independently inflatable bladders being fluidically connected to one of the plurality of inflate valves and one of the plurality of deflate valves.

* * * * *